(12) United States Patent
Shao et al.

(10) Patent No.: US 11,525,996 B2
(45) Date of Patent: Dec. 13, 2022

(54) FIBER BUNDLE IMAGE PROCESSING METHOD AND APPARATUS

(71) Applicant: SUZHOU MICROVIEW MEDICAL TECHNOLOGIES CO., LTD., Suzhou (CN)

(72) Inventors: Jinhua Shao, Suzhou (CN); Houli Duan, Suzhou (CN); Jin Sun, Suzhou (CN)

(73) Assignee: SUZHOU MICROVIEW MEDICAL TECHNOLOGIES CO., LTD., Suzhou (CN)

( * ) Notice: Subject to any disclaimer, the term of this patent is extended or adjusted under 35 U.S.C. 154(b) by 359 days.

(21) Appl. No.: 16/850,048

(22) Filed: Apr. 16, 2020

(65) Prior Publication Data
US 2020/0241277 A1    Jul. 30, 2020

Related U.S. Application Data

(63) Continuation of application No. PCT/CN2018/110250, filed on Oct. 15, 2018.

(30) Foreign Application Priority Data

Oct. 16, 2017    (CN) .......................... 201710959003.1

(51) Int. Cl.
*G02B 21/00* (2006.01)
*G02B 21/36* (2006.01)

(52) U.S. Cl.
CPC ......... *G02B 21/367* (2013.01); *G02B 21/361* (2013.01)

(58) Field of Classification Search
CPC combination set(s) only.
See application file for complete search history.

(56) References Cited

U.S. PATENT DOCUMENTS

| 4,480,636 A | * | 11/1984 | Karaki | .................. | A61B 1/042 348/307 |
|---|---|---|---|---|---|
| 4,601,537 A | | 7/1986 | Saccocio | | |
| 8,718,398 B2 | | 5/2014 | Perchant | | |

(Continued)

FOREIGN PATENT DOCUMENTS

| CN | 1758754 A | 4/2006 |
|---|---|---|
| CN | 101882326 A | 11/2010 |

(Continued)

OTHER PUBLICATIONS

Machine Translation for CN106251339 (Year: 2016).*

(Continued)

*Primary Examiner* — Dave Czekaj
*Assistant Examiner* — Shanika M Brumfield
(74) *Attorney, Agent, or Firm* — J.C. Patents

(57) ABSTRACT

Provided are a fiber bundle image processing method (200) and an apparatus. The method (200) includes: determining pixel information corresponding to a center position of a fiber in a sample image; correcting the determined pixel information; and reconstructing the sample image based on the corrected pixel information to obtain a reconstructed image. The method (200) and apparatus can not only obtain a more ideal fiber-bundle processed image, but also have a smaller calculation amount, and the entire calculation process takes less time.

10 Claims, 8 Drawing Sheets

200

S210  Determining pixel information corresponding to a center position of a fiber in a sample image S220  Correcting the determined pixel information S230  Reconstructing the sample image based on the corrected pixel information to obtain a reconstructed image

(56) References Cited

U.S. PATENT DOCUMENTS

| | | | |
|---|---|---|---|
| 2005/0207668 A1 | 9/2005 | Perchant | |
| 2011/0254980 A1* | 10/2011 | Perchant | G02B 6/06 348/E5.031 |
| 2015/0369589 A1* | 12/2015 | Ishihara | G01B 11/14 250/208.1 |
| 2016/0247271 A1* | 8/2016 | Hishida | G06V 10/44 |
| 2017/0178317 A1 | 6/2017 | Besley | |
| 2017/0331990 A1* | 11/2017 | Heshmat Dehkordi | G02B 6/04 |
| 2020/0241277 A1* | 7/2020 | Shao | G02B 21/361 |

FOREIGN PATENT DOCUMENTS

| | | |
|---|---|---|
| CN | 103218991 A | 7/2013 |
| CN | 104933707 A | 9/2015 |
| CN | 105894450 A | 8/2016 |
| CN | 106204419 A | 12/2016 |
| CN | 106251339 A | 12/2016 |
| CN | 106844289 A | 6/2017 |
| CN | 106859579 A | 6/2017 |
| CN | 106981090 A | 7/2017 |
| CN | 107622491 A | 1/2018 |
| CN | 107678153 A | 2/2018 |
| DE | 102006011707 A1 | 9/2007 |
| JP | H08191440 A | 7/1996 |
| JP | H10-48689 A | 2/1998 |
| JP | H11355574 A | 12/1999 |
| JP | 2012514248 A | 6/2012 |
| KR | 20150037369 A | 4/2015 |
| KR | 20160039646 A | 4/2016 |

OTHER PUBLICATIONS

Machine Translation for CN103218991 (Year: 2013).*
Notice of Allowance of the priority CN application No. 201710959003.1.
The Notice of Allowance of corresponding KR application.
The first Office Action of corresponding JP application.
The first Office Action of corresponding KR application.
The third Office Action of corresponding AU application.
The first Office Action of RU application No. 2020115459.
The extended European search report of EP application No. 18868761.0.
"Color reflectance fiber bundle endomicroscopy without back-reflections", Journal of Biomedical Optics, vol. 19(3), Mar. 2014.
"Methods for removing honeycomb noise from fiber endoscopic images", Proceedings of SPIE vol. 4224(2000).
"Physically motivated enhancement of color images for fiber endoscopy", by Christian Winter et al., MICCAI 2007, Part II, LNCS 4792, pp. 360-367, 2007.
Winter, Christian et al, "Physically Motivated Enhancement of Color Images for Fiber Endoscopy" Medical Image Computing and Computer-Assisted Intervention—MICCAI 2007, Part II; (2007); pp. 360-367.
The Chinese First Examination Report of corresponding Chinese application No. 201710959003.1, dated Apr. 19, 2019.
The International Search Report of corresponding International application No. PCT/CN2018/110250, dated Jan. 18, 2019.

* cited by examiner

200

S210 — Determining pixel information corresponding to a center position of a fiber in a sample image S220 — Correcting the determined pixel information S230 — Reconstructing the sample image based on the corrected pixel information to obtain a reconstructed image

S410 — Collecting a reference image using a fiber bundle

S420 — Determining a reference pixel in the reference image, where the reference pixel has a pixel value higher than pixel values of its surrounding pixels S430 — Determining, according to a pixel position of the reference pixel, a pixel position corresponding to a center of a fiber in a fiber bundle image collected using the same fiber bundle

FIG. 4

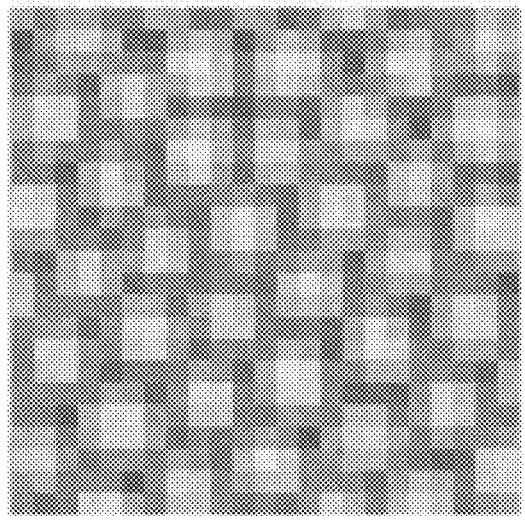
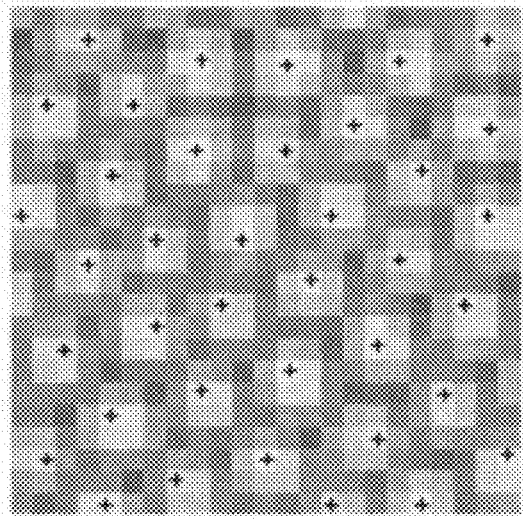
+ Position of fiber
FIG. 6  FIG. 7
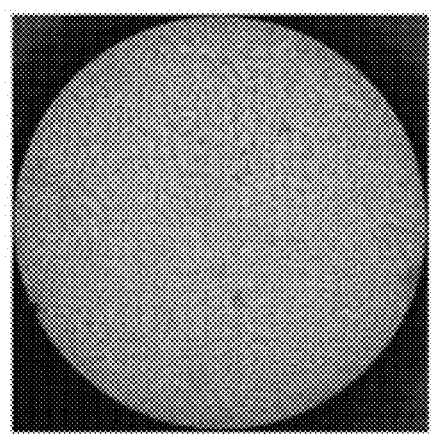
FIG. 8

S230

S231 — Performing a triangulation on a sample image based on determined pixel information S232 — Determining a weight of a pixel based on a triangle where the pixel is located and which is obtained by the triangulation S233 — Calculating a reconstructed pixel value of the pixel by using a linear interpolation method according to the weight of the pixel

FIG. 9

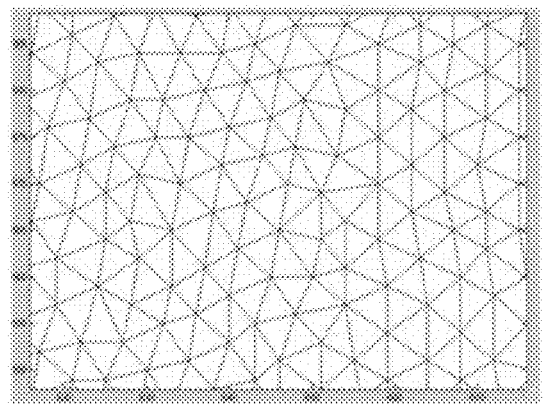
FIG. 10
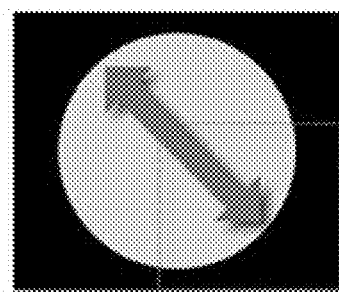
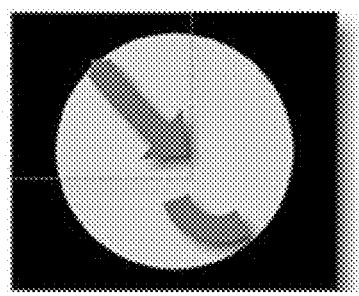
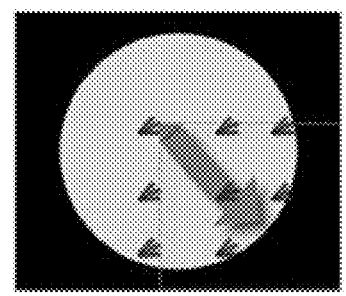
FIG. 11A    FIG. 11B    FIG. 11C

FIBER BUNDLE IMAGE PROCESSING METHOD AND APPARATUS

CROSS-REFERENCE TO RELATED APPLICATIONS

This application is a continuation of International Application No. PCT/CN2018/110250, filed on Oct. 15, 2018, which claims the priority benefit of China Patent Application No. 201710959003.1, filed on Oct. 16, 2017. The contents of the above identified applications are incorporated herein by reference in their entireties.

TECHNICAL FIELD

The present disclosure relates to the field of medical image processing, and more particularly, to a fiber bundle image processing method and apparatus.

BACKGROUND

With the progress of society and the development of science and technology, more and more electronic imaging equipment is applied to the medical field. Therefore, higher and higher requirements have also been put forward for the accuracy and speed of medical image post-processing.

For example, fiber optic microscopy can realize biological tissue tomography test, which can not only detect the tumor lesion tendency of biological tissues in advance, but also avoid the pain caused by puncture surgery to clinical patients. Fiber optic microscopes have broad market prospects in clinical patient examination, screening, and medical and biological researches.

FIG. 1 exemplarily shows a part of an existing fiber bundle image. As shown in FIG. 1, the existing fiber bundle image has a honeycomb-shaped noise and fails to present the target area of biological tissues well. Although there are currently some reconstruction techniques for fiber bundle images, they are generally computationally intensive and time consuming.

SUMMARY

The present disclosure has been proposed in view of the above problems. The present disclosure provides a fiber bundle image processing method and apparatus.

According to an aspect of the present disclosure, there is provided a fiber bundle image processing method, including:
determining pixel information corresponding to a center position of a fiber in a sample image;
correcting the determined pixel information; and
reconstructing the sample image based on the corrected pixel information to obtain a reconstructed image.

Exemplarily, the correcting the determined pixel information includes calculating a corrected pixel value according to the following formula:

$$F=(I_s-I_b)\times K,$$

where F represents the corrected pixel value, $I_s$ represents a determined pixel value, $I_b$ represents a pixel value of a corresponding pixel in a background image, and K represents a correction coefficient.

Exemplarily, before the correcting step, the method further includes calculating the correction coefficient K according to a reference image and the background image by using the following formula:

$$K=k/(I_c-I_b),$$

where $I_c$ represents a pixel value of a corresponding pixel in the reference image, and k represents a proportional coefficient, which is equal to a median value of differences between pixel value of a pixel in the reference image and a pixel value of a corresponding pixel in the background image.

Exemplarily, the method further includes:
sampling a uniform fluorescent sample to obtain the reference image; and
sampling a fluorescent-free sample to obtain the background image.

Exemplarily, the reconstructing the sample image based on the corrected pixel information includes: obtaining a reconstructed pixel value of a pixel by using an interpolation method based on a weight of the pixel and the corrected pixel information.

Exemplarily, the obtaining a reconstructed pixel value of a pixel includes:
performing a triangulation on the sample image based on the determined pixel information;
determining a weight of the pixel based on a triangle where the pixel is located and which is obtained by the triangulation; and
calculating the reconstructed pixel value of the pixel according to the weight of the pixel using a linear interpolation method.

Exemplarily, the determining the weight of the pixel includes:
determining distances from the pixel to vertices of the triangle where the pixel is located; and
setting weights of the pixel corresponding to the vertices of the triangle to be inversely proportional to the distances between the pixel and the vertices.

Exemplarily, the calculating a reconstructed pixel value of the pixel is calculated according to the following formula:

$$Gx=Wa*Ga+Wb*Gb+Wc*Gc, \text{ where,}$$

Gx represents a reconstructed pixel value of a pixel x;
Wa and Ga respectively represent a weight of the pixel x corresponding to a vertex a of a triangle in which the pixel x is located and a corrected pixel value of the vertex a;
Wb and Gb respectively represent a weight of the pixel x corresponding to a vertex b of a triangle in which the pixel x is located and a corrected pixel value of the vertex b; and
Wc and Gc respectively represent a weight of the pixel x corresponding to a vertex c of a triangle in which the pixel x is located and a corrected pixel value of the vertex c.

Exemplarily, the method further includes: performing a registration processing on the reconstructed image and another image.

According to another aspect of the present disclosure, there is further provided a fiber bundle image processing apparatus, including:
a memory, configured to store a program;
a processor, configured to run the program;
where the program, when running in the processor, is configured to perform the following steps:
determining pixel information corresponding to a center position of a fiber in a sample image;
correcting the determined pixel information; and
reconstructing the sample image based on the corrected pixel information to obtain a reconstructed image.

The above-mentioned fiber bundle image processing method and apparatus can not only obtain a more ideal processed image, but also have less computation, and the entire calculation process takes less time.

BRIEF DESCRIPTION OF THE DRAWINGS

The above and other objects, features, and advantages of the present disclosure will become more obvious by describing the embodiments of the present disclosure in more detail with reference to the accompanying drawings. The drawings are used to provide a further understanding of the embodiments of the present disclosure, and form a part of the description. They are used to explain the present disclosure together with the embodiments of the present disclosure, but do not constitute a limitation on the present disclosure. In the drawings, the same reference numerals generally represent the same or similar parts or steps.

FIG. 2 is a schematic flowchart of a fiber bundle image processing method according to an embodiment of the present disclosure;

FIG. 4 shows a schematic flowchart of an analysis method of a fiber bundle image according to a specific embodiment of the present disclosure;

FIG. 6 shows a partially enlarged schematic view of a reference image according to an embodiment of the present disclosure;

FIG. 7 shows a partially enlarged schematic diagram of a reference image in which pixels corresponding to centers of fibers are identified according to an embodiment of the present disclosure;

FIG. 8 shows a schematic diagram of a fiber bundle image in which pixels corresponding to centers of fibers are identified according to an embodiment of the present disclosure;

FIG. 9 shows a schematic flowchart of reconstructing steps according to an embodiment of the present disclosure;

FIG. 10 shows a partially enlarged schematic diagram of a sample image obtained by Delaunay triangulation according to an embodiment of the present disclosure;

FIG. 11A and FIG. 11B respectively show a reconstructed image and another image to be registered according to an embodiment of the present disclosure; and FIG. 11C is a schematic diagram showing a result of non-rigid registration of the two images shown in FIGS. 11A and 11B.

DETAILED DESCRIPTION OF THE EMBODIMENTS

In order to make the objects, technical solutions, and advantages of the present disclosure more obvious, exemplary embodiments according to the present disclosure will be described in detail below with reference to the accompanying drawings. Obviously, the described embodiments are only part of embodiments of the present disclosure, not all embodiments of the present disclosure. It should be understood that the present disclosure is not limited by the exemplary embodiments described herein. All other embodiments obtained by those skilled in the art based on the described embodiments of the present disclosure without creative efforts shall fall within the protection scope of the present disclosure.

FIG. 2 illustrates a fiber bundle image processing method 200 according to an embodiment of the present disclosure. The fiber bundle image processing method 200 can be used to reconstruct an original fiber bundle image so as to more ideally present a target area of a biological tissue.

As shown in FIG. 2, in step S210, pixel information corresponding to a center position of a fiber in a sample image is determined.

Figure 1:
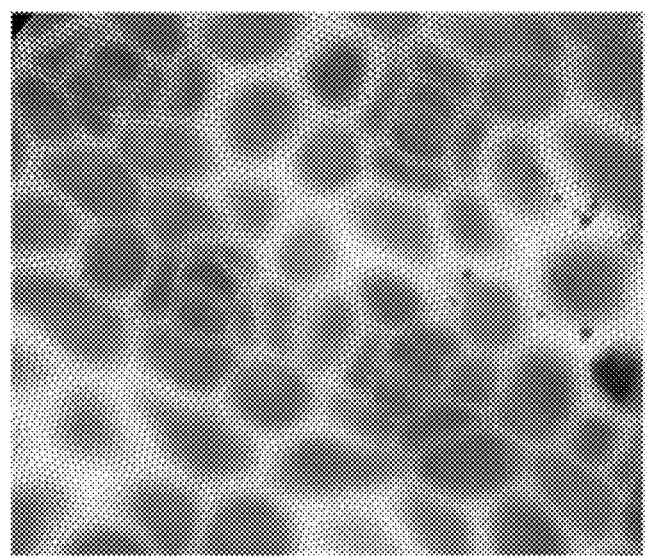
FIG. 1 exemplarily shows a part of an existing fiber bundle image.

The sample image is a fiber bundle image obtained using a fiber bundle. A fiber bundle includes many fibers, such as more than 30,000. These fibers have an irregular arrangement in the bundle. Each fiber can be used as an optical path, and these optical paths can transmit the information in the target area of the biological tissue to generate a fiber bundle image in an imaging device. Fiber bundle images obtained by the same fiber bundle have the same size, that is, their resolutions, widths and heights are the same. In some examples, the imaging area of the fiber bundle in the fiber bundle image may be, for example, a circular area. Because the fiber bundle includes multiple fibers, honeycomb-shaped noise will inevitably appear in the fiber bundle image, as shown in the fiber bundle image in FIG. 1. Each of these honeycombs roughly corresponds to one fiber. The existence of the honeycomb-shaped noise has caused users a lot of trouble in observing the target area of the biological tissue using the fiber bundle image, which has seriously affected the user experience.

One honeycomb in the fiber bundle image typically includes multiple pixels. In other words, each fiber in the fiber bundle may correspond to multiple pixels in the fiber bundle image, such as about twenty. There is one pixel in the multiple pixels, which corresponds to the center of the fiber. It is assumed that during the process of capturing different fiber bundle images with the same fiber bundle, both the far end and the near end of the fiber bundle do not change, then the correspondence between the pixels in the fiber bundle image and the fibers in the fiber bundle remains unchanged. Therefore, the position of the pixel corresponding to the center of each fiber in the fiber bundle image remains unchanged. In addition, the pixel value corresponding to the center of the fiber can ideally reflect the true appearance of the target area of the biological tissue.

In this step S210, pixels corresponding to centers of fibers in the fiber bundle in the sample image are determined and pixel information of the pixels is extracted. Optionally, the determined pixel information includes positions and pixel values of the pixels. The positions of the pixels can be represented by row and column values of the pixels in the sample image. Specifically, the positions of the pixels can be represented by a one-dimensional array. An element in the array is a value representing a position of a pixel. The position Px of the pixel x can be represented by the following formula, $$Px = \text{row number where pixel } x \text{ is located} \times \text{width of the sample image} + \text{column number where pixel } x \text{ is located}.$$

The position Px of the pixel x is pixel number when counting one by one from the pixel in the first row and the first column of the fiber bundle image to the pixel x. By querying the sample image through a position of a pixel, the pixel value of the pixel can be obtained.

In step S220, the pixel information determined in step S210 is corrected.

As described in step S210, the determined pixel information may include the positions and pixel values of the pixels corresponding to the centers of the fibers. In step S220, only the pixel values of the pixels corresponding to the center positions of the fibers in the sample image are corrected to make them more realistically reflect the target area.

Figure 3:
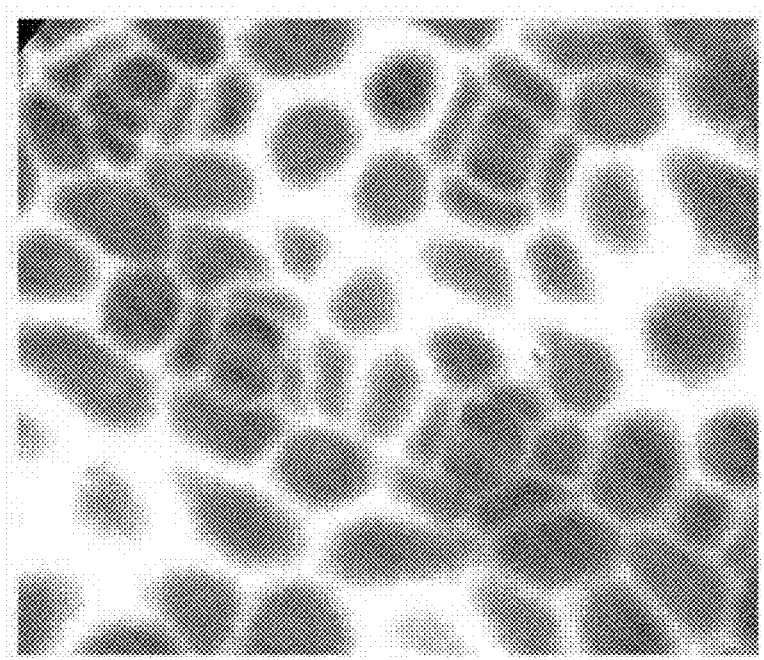
FIG. 3 shows a partially enlarged schematic diagram of a reconstructed image of the fiber bundle image shown in FIG. 1 according to an embodiment of the present disclosure.

In step S230, a sample image is reconstructed based on the pixel information corrected in step S220 to obtain a reconstructed image. In step S220, only the pixel values of the pixels corresponding to the centers of the fibers in the sample image are adjusted. Based on the adjustment result, the pixel values of other pixels, i.e., pixels that do not correspond to the center positions of the fibers, in the sample image are adjusted, thereby completing reconstruction of the sample image. FIG. 3 shows a partially enlarged schematic diagram of a reconstructed image of the fiber bundle image shown in FIG. 1 according to an embodiment of the present disclosure.

From the perspective of the image, as shown in FIG. 3, the honeycomb-shaped noise in the original sample image is eliminated from the reconstructed image through the above image processing operation. In addition, the brightness of the entire reconstructed image is relatively uniform, avoiding the problem that the edge is dark while the center is bright. From the perspective of image processing, the entire processing process has smaller calculation amount and takes less time.

According to an embodiment of the present disclosure, a fiber bundle image analysis method is provided. By using this analysis method, the pixel information corresponding to the center positions of the fibers in the fiber bundle image can be determined more accurately. As described above, in the case where the far end or near end of the fiber bundle does not change during the process of capturing different fiber bundle images with the same fiber bundle, the correspondence between the pixels in the captured fiber bundle image and the fibers in the fiber bundle remains unchanged. Therefore, from this perspective, one fiber bundle image can be used to analyze all other fiber bundle images captured with the same fiber bundle. FIG. 4 shows a schematic flowchart of a fiber bundle image analysis method 400 according to a specific embodiment of the present disclosure.

In step S410, the fiber bundle is used to collect a fiber bundle image as a reference image. The analysis results of this reference image can be applied to all other fiber bundle images captured with the same fiber bundle.

Optionally, the reference image is obtained by sampling a uniformly light-emitting sample using the fiber bundle. In theory, the reference image should be a fiber bundle image with uniform pixel values and uniform brightness. The pixels of the image formed from the uniformly light-emitting sample are identical, and the sample itself will not have any negative effect on the analysis method 400, ensuring that the pixel information corresponding to the center positions of the fibers in the reference image is determined more accurately.

Figure 5:
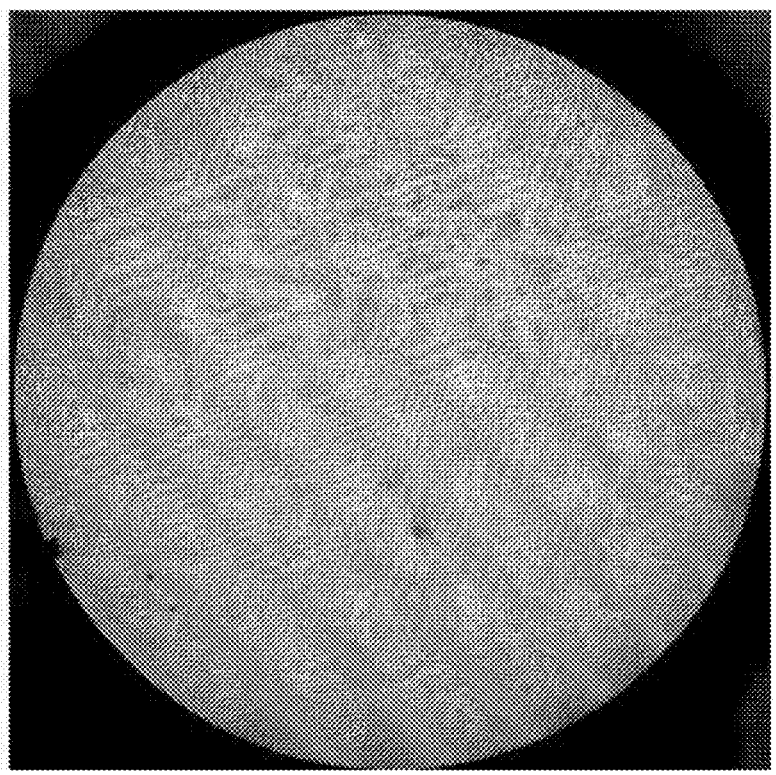
FIG. 5 shows a reference image obtained by sampling a uniform fluorescent sample according to an embodiment of the present disclosure.

The uniformly light-emitting sample may be a uniformly fluorescent sample. Thus, the reference image is a fiber bundle image with a constant fluorescence rate. FIG. 5 shows a reference image obtained by sampling a uniform fluorescent sample according to an embodiment of the present disclosure. In the practical application of the fiber bundle image, the fluorescent sample is generally imaged. Therefore, the reference image obtained by sampling the uniform fluorescent sample better guarantees the accuracy of the analysis method. It can be understood that the uniform fluorescent sample is only an example, not limiting, and the reference image can also be obtained by sampling a sample emitting other visible light.

In step S420, a reference pixel in the reference image collected in step S410 is determined. The reference pixel has a pixel value higher than its surrounding pixels, and the reference pixel corresponds to a center of only one fiber in the fiber bundle.

As mentioned above and shown in FIG. 1, there are honeycombs one-to-one corresponding to the fibers in the fiber bundle image. The pixel value information of the honeycombs can be used to determine the reference pixels corresponding to the centers of the fibers in the fiber bundle. Generally, a reference pixel corresponding to a center of a fiber in a fiber bundle is the pixel with the highest brightness among all pixels corresponding to the fiber, that is, the pixel with the largest pixel value. In other words, a pixel value of a reference pixel corresponding to a fiber center is higher than pixel values of surrounding pixels thereof (that is, other pixels corresponding to the same fiber). FIG. 6 shows a partially enlarged schematic diagram of a reference image according to an embodiment of the present disclosure. FIG. 7 shows a schematic diagram of a pixel corresponding to a center of a fiber in a partially enlarged schematic diagram of the reference image shown in FIG. 6 according to an embodiment of the present disclosure. For the sake of clarity, in the schematic diagram shown in FIG. 7, the pixel value of the reference pixel corresponding to the center of the fiber is marked with a "+" sign.

Optionally, as described above, a one-dimensional array may be used to represent the determined position of the reference pixel.

In step S430, according to a pixel position of the reference pixel in the reference image, a pixel position corresponding to a center of a fiber in a fiber bundle image collected by using the same fiber bundle is determined.

As described above, because the relative positions of the fibers in the fiber bundle are fixed, the relative positions between pixels corresponding to the centers of the fibers in the fiber bundle image collected using the same fiber bundle are also fixed. Therefore, according to the pixel positions of the reference pixels in the reference image, the positions corresponding to the centers of the fibers in all fiber bundle images collected using the same fiber bundle can be determined, especially for the case where the far and near ends of the fiber bundle remain unchanged.

FIG. 8 shows a schematic diagram of a fiber bundle image in which pixels corresponding to centers of fibers are identified according to an embodiment of the present disclosure. In the schematic diagram shown in FIG. 8, the pixel values of the pixels corresponding to the centers of the fibers are assigned to 0.

In the above-mentioned fiber bundle image analysis method, a reference image is used to determine pixel information of positions corresponding to centers of fibers in other fiber bundle images. Compared with directly determining the pixel information corresponding to the center positions of the fibers based on the pixel value of the fiber bundle image itself, the results of the above analysis method are not affected by an imaging object in the fiber bundle image, the results are thus more accurate and it is easy to implement the above analysis method.

Optionally, the above step S420 may specifically include steps S421 and S422.

In step S421, image segmentation is performed on the reference image to determine a fiber bundle imaging area in the reference image. As shown in the reference image shown in FIG. 5, the reference image includes a fiber bundle imaging area and a background area having no practical significance. The fiber bundle imaging area is a circular area in the middle. The background area is a black area around the circular area, being meaningless for the analysis of the image. The image segmentation can be performed by image segmentation processing such as threshold segmentation and region growing. The image segmentation operation can further reduce the calculation amount of the entire image processing method.

In step S422, the reference pixels are determined in the fiber bundle imaging area.

In one example, a region maximum value method is first used to process the fiber bundle imaging area. Then, a pixel whose pixel value is a region maximum value is determined to be the reference pixel. The region maximum value method is an image segmentation method. As described above, a pixel corresponding to a center of a fiber in the fiber bundle is the pixel with the highest brightness among all pixels corresponding to the fiber, that is, the brightest pixel in a honeycomb. The region maximum value method is used to perform image analysis on the reference image, and the pixel with the regional maximum value is used as the reference pixel corresponding to the center of the fiber.

In the above example, the region maximum value method is used to determine the reference pixel, and this method effectively uses the following objective rules: for all pixels corresponding to one fiber in the reference image, the pixel corresponding to the center of the fiber has the highest pixel value compared with other pixels. Therefore, the method can quickly and accurately determine the pixel value of the center of the reference fiber, thereby ensuring fast and accurate analysis of the fiber bundle image.

Those of ordinary skill in the art can understand that the region maximum value method is merely an example and is not a limitation to the present disclosure, and other methods may also be used to determine the pixel value of the center of the reference pixel, such as an empirical threshold method.

It can be understood that the foregoing fiber bundle image analysis method may be included in the fiber bundle image processing method. The fiber bundle image analysis method can determine information of pixels corresponding to the center positions of the fibers in the fiber bundle image including the sample image. Thereby, more accurate information is obtained. Specifically, a corresponding position of the sample image may be queried according to a position, which is determined in the fiber bundle image analysis method, of a pixel corresponding to a center of a fiber in the reference image. First, row number and column number of a pixel y is determined according to a position Py of a reference pixel y and a width of the fiber bundle image. Then, the pixel information of the pixel in the sample image can be obtained by querying the pixel value at the position of the sample image according to the row number and the column number of the pixel y.

Therefore, the above fiber bundle image analysis method provides accurate analysis results for the fiber bundle image processing method, thereby ensuring that the fiber bundle image processing method has a small calculation amount and a good processing effect.

In one embodiment, the background image is used to correct the pixel information determined in step S210. Specifically, the pixel information determined in step S210 may be corrected according to the following formula.

$$F=(I_s-I_b) \times K,$$

where F represents the pixel value after the pixel in the sample image are corrected, $I_s$ represents the pixel value determined in step S210, $I_b$ represents the pixel value of a corresponding pixel in the background image, and K represents a correction coefficient.

Optionally, the background image is an image generated by imaging a non-luminous sample, such as a fiber bundle image with a fluorescence rate of zero. For example, the background image can be obtained by sampling a fluorescent-free sample. As long as the near end of the fiber bundle does not change, the pixel values in the background image will not change. The "corresponding pixel" here means that the pixels are in the same position in respective images. In essence, the pixels correspond to the same position (for example, the center of the fiber) of the same fiber in the fiber bundle. Therefore, the corresponding position in the background image may be queried according to the position, which is determined in step S210, of the pixel corresponding to the center of the fiber, so as to obtain the pixel value of the corresponding pixel in the background image.

If the pixel position of the corresponding to the center of the fiber in step S210 is determined through the above fiber bundle image analysis method 400, the corresponding position in the background image may be queried directly according to the position of the reference pixel in the reference image. By querying the background image according to the position of the pixel, the pixel value of the corresponding pixel in the background image can be obtained. It can be understood that the corresponding pixel in the background image also corresponds to the center of the same fiber.

In the above embodiment, for each pixel value $I_s$ determined in step S210, first, a difference between the pixel value $I_s$ and a pixel value $I_b$ of a corresponding pixel in the background image is calculated, referred to as a first difference; then, a product of the difference and a correction coefficient is calculated. The correction coefficient K can be any real number between 0.5 and 1.5. The correction coefficient K can be set according to an experience.

Optionally, the correction coefficient K can also be calculated according to the background image and the reference image using the following formula: $K=k/(I_c-I_b)$, where $I_c$ represents the pixel value of the corresponding pixel in the reference image, and $I_b$ represents the pixel value of the corresponding pixel in the background image, k represents a proportional coefficient, which is equal to a median value of a difference between the pixel value of the pixel in the reference image and the pixel value of its corresponding pixel in the background image.

The reference image may be a reference image involved in the fiber bundle image analysis method described above. In an example, first, for the pixels corresponding to the center positions of the fibers in the reference image, differences between the pixels and corresponding pixels in the background image are calculated, and referred to as standard deviations. Using this method to calculate the standard deviations can reduce the amount of calculation while ensuring the accuracy of the calculation. Alternatively, for each pixel in the reference image, a difference between the each pixel and its corresponding pixel in the background image may be calculated separately to obtain a standard deviation. The median k of all standard deviations is calculated. Then, for the pixel value $I_s$ determined in step S210, a difference between the pixel value $I_c$ of the corresponding pixel in the reference image and the pixel value $I_b$ of the corresponding pixel in the background image is calculated, and referred to as a second difference. Finally, according to a quotient of the median k and the second difference, the correction coefficient K is determined.

The correction operation in this example may obtain a satisfactory correction effect without complicated calculations, thereby obtaining a desired image processing result.

Optionally, the above step S230 includes: obtaining a reconstructed pixel value of a pixel by using an interpolation method based on a weight of the pixel and the pixel information corrected in step S220. The corrected pixel information reflects the imaging target more realistically, and the above-mentioned correction operation is only directed to the pixels corresponding to the centers of the fibers. Therefore, for each pixel in the fiber bundle image, its weight can be determined according to a position of a pixel corresponding to a center of a fiber and being closer to the each pixel.

FIG. 9 shows a schematic flowchart of step S230 according to an embodiment of the present disclosure. As shown in FIG. 9, step S230 may include:

Step S231, performing a triangulation on a sample image based on the pixel information determined in step 210.

Specifically, the pixels corresponding to the centers of the fibers in the fiber bundle are a finite point set in the sample image. This point set forms all vertices of the triangle. The sample image is cut into multiple triangles. Among them, any two triangles either do not intersect or just intersect on a common side.

Optionally, the above-mentioned triangulation is implemented by using a Delaunay triangulation algorithm. Although the arrangement of the fibers in the fiber bundle is irregular, the distances between centers of adjacent fibers are approximately the same, and are approximately equal to the diameters of the fibers. FIG. 10 illustrates a portion of a sample image after Delaunay triangulation according to one embodiment of the present disclosure. As shown in FIG. 10, a unique triangulation result can be obtained by using the Delaunay triangulation algorithm, and vertices of other triangles will not appear in a circumscribed circle of any triangle can be guaranteed. The triangulation algorithm is more suitable for the image processing method according to embodiments of the present disclosure, and can obtain a more ideal image processing result.

In step S232, determining a weight of a pixel based on a triangle where the pixel is located and which is obtained by the triangulation.

For any pixel in the fiber bundle image, its weight can have multiple values, and each weight corresponds to a pixel that is closer to the each weight and corresponds to the center position of the fiber. For brevity, the pixel corresponding to the weight may be referred to as a reference pixel. It can be understood that each reference pixel is a vertex of a triangle obtained by triangulation. A final pixel value of the pixel can be determined according to the weight of the pixel and the pixel value of the reference pixel corresponding to the weight.

Optionally, for any pixel in the fiber bundle image, the farther it is from a reference pixel, the smaller the weight of the pixel with respect to the reference pixel is; and vice versa.

Exemplarily, for each pixel in the fiber bundle image, its weight is determined according to positions of three reference pixels. A weight may be determined for each of the 3 reference pixels, thereby forming a weight lookup table. Table 1 shows a weight lookup table according to an embodiment of the present disclosure. In Table 1, the first weight, the second weight, and the third weight represent weights of a pixel, whose weights need to be determined, with respect to the first reference pixel, the second reference pixel, and the third reference pixel, respectively. As shown in Table 1, for pixel $x_1$, the first weight and the third weight are equal and relatively small, which indicates that the distances from the pixel $x_1$ to the first reference pixel and the third reference pixel are equal, and the distances are relatively far; the second weight is relatively large, which indicates that the pixel $x_1$ is relatively close to the second reference pixel.

TABLE 1

Weight Lookup Table

| Name of pixel | Name of first reference pixel | Name of second reference pixel | Name of third reference pixel | First weight | Second weight | Third weight |
|---|---|---|---|---|---|---|
| $x_1$ | $a_1$ | $b_1$ | $c_1$ | 0.1 | 0.8 | 0.1 |
| $x_2$ | $a_1$ | $b_1$ | $c_1$ | 0.2 | 0.7 | 0.1 |
| $x_3$ | $a_1$ | $b_1$ | $c_2$ | 0.5 | 0.3 | 0.2 |
| $x_4$ | $a_3$ | $b_3$ | $c_3$ | 0.2 | 0.6 | 0.2 |
| ... | ... | ... | ... | ... | ... | ... |

Based on the triangulation results, each pixel in the sample image has a unique triangle where it is located, either on three sides of the triangle or inside the triangle. The three vertices of the unique triangle can be used as reference pixels of the pixel. Based on the distances between the pixel and the three reference pixels, it is possible to determine the weight of the pixel corresponding to each reference pixel.

For each pixel in the sample image, first, the distances from the pixel to vertices (that is, the reference pixels) of a triangle where the pixel is located can be determined. The pixel can be on the sides of the triangle or inside the triangle. Then, according to the distances between the pixel and three vertices of the triangle where the pixel is located, the weights of the pixel corresponding to the three vertices of the triangle are determined. Optionally, for a vertex of the triangle, a weight of the pixel corresponding to the vertex is set to be inversely proportional to a distance between the pixel and the vertex. For example, a pixel located at an out center of a triangle has weights of 0.333 corresponding to its reference pixels. For a pixel located at a vertex of a triangle, it can be considered that the weight corresponding to the vertex where it is located is 1 and the weights corresponding to the other two vertices are 0. By determining weights of each pixel in this way, the reconstruction effect is more ideal, and the process is simple and easy to be implemented.

Obtaining weights of each pixel in the fiber bundle image based on the triangulation has less calculation amount while ensuring the accuracy of the calculation results.

The Delaunay triangulation algorithm given above is only an example, and other methods, such as the Krig method, can also be used to obtain the weights of each pixel.

It can be understood that the foregoing method for determining the weight is merely an example, not a limitation. For example, although in the above example, the weight of each pixel is determined based on positions of three reference pixels, this is merely an illustration and not a limitation on the present disclosure. For example, the weight of each pixel can also be determined based on a reference pixel closest to it, or 4 or more reference pixels. As another example, the weight of a pixel can be set based on an experience.

Step S233: calculating a reconstructed pixel value of the pixel by using a linear interpolation method according to the weight of the pixel.

Optionally, a reconstructed pixel value Gx of the pixel x of the reconstructed image is calculated according to the following formula.

$$Gx=Wa*Ga+Wb*Gb+Wc*Gc, \text{ where,}$$

Wa and Ga respectively represent a weight of the pixel x corresponding to a vertex a of the triangle where it is located and a corrected pixel value of the vertex a, Wb and Gb respectively represent a weight of the pixel x corresponding to a vertex b of the triangle where it is located and a corrected pixel value of the vertex b, and Wc and Gc respectively represent a weight of the pixel x corresponding to a vertex c of the triangle where it is located and a corrected pixel value of the vertex c.

According to an embodiment of the present disclosure, the fiber bundle image processing method further includes a step of registering the reconstructed image above and another image. The another image may also be a reconstructed image. Image registration is used to calculate a relative displacement of two images. After the image registration, the same contents of the two images will be spatially coincident.

Optionally, the registration operation may adopt a correlation coefficient method. By searching the maximum of correlation coefficients corresponding to all possible displacements, a correct displacement that can be used to register the two images is determined. The registration calculation adopting the correlation coefficient method has a short calculation time and can meet the real-time needs.

Although the registration method using the correlation coefficient is relatively fast, its registration accuracy is low. Optionally, the registration operation may also adopt an iterative registration method. Although the iterative registration method is slow, it can meet a high accuracy requirement.

According to an embodiment of the present disclosure, the reconstructed image and the another image are iteratively registered directly according to the positions of the pixels corresponding to the centers of the fibers in the fiber bundle, the corrected pixel information, and the another image. In this embodiment, the registration operation uses only relevant elements corresponding to the centers of the fibers in the fiber bundle, and ignores other elements, such as pixels in the reconstructed image that do not correspond to the centers of the fibers in the fiber bundle. Therefore, the calculation speed of the iterative registration is effectively improved while ensuring the calculation accuracy of the iterative registration.

In practical applications, in addition to a rigid registration, sometimes a non-rigid registration is required. For example, a human tissue to be examined by the doctor has a peristalsis during the time period of collecting a sample image; for another example, during a sample image acquisition, a change in the pressure of a probe causes a local deformation of a target tissue, and so on. So, optionally, registering a reconstructed image and another image includes the following operations: first, performing a rigid body registration on the reconstructed image and the another image; then, resampling the another image according to a result of the rigid body registration; and finally, performing a non-rigid body registration on an overlapped part between the resampled another image and the reconstructed image. Optionally, the non-rigid body registration may use a free deformation method or a Demons registration algorithm. FIGS. 12A, 12B, and 12C illustrate a process of the above non-rigid body registration. FIGS. 12A and 12B respectively show a reconstructed image to be registered and another image according to an embodiment of the present disclosure. Where the dashed rectangle indicates an overlapped part of the two as determined by a rigid body registration. For this overlapped part, the another image is resampled. FIG. 12C is a schematic diagram showing a result of performing a non-rigid body registration on the overlapped part of the another resampled image and the reconstructed image.

Because the previous image processing operation obtains an ideal reconstructed image relatively quickly, the image registration and stitching operations can also be faster and more accurate.

According to another aspect of the present disclosure, a fiber bundle image processing apparatus is also provided. The fiber bundle image processing apparatus includes a memory and a processor. The memory is configured to store a program. The processor is configured to run the program. Where the program, when running in the processor, is used to perform the following steps: Step S1, determining pixel information corresponding to center positions of fibers in a sample image; Step S2, correcting the determined pixel information; and Step S3, reconstructing the sample image based on the corrected pixel information to obtain a reconstructed image.

Optionally, the fiber bundle image processing apparatus further includes an image collecting device, the image collecting device is configured to sample a uniform fluorescent sample to obtain the reference image, and sample a fluorescent-free sample to obtain the background image.

Optionally, when Step S2 is performed, calculating a corrected pixel value according to the following formula is specifically performed:

$$F=(I_s-I_b) \times K,$$

where F represents the corrected pixel value, $I_s$ represents the determined pixel value, $I_b$ represents a pixel value of a corresponding pixel in the background image, and K represents a correction coefficient.

Optionally, before Step S2 is performed, calculating the correction coefficient K by using the following formula according to the reference image and the background image is further performed:

$$K=k/(I_c-I_b),$$

where, $I_c$ represents a pixel value of a corresponding pixel in the reference image, and k represents a proportional coefficient, which is equal to a median value of a difference between the pixel value of the pixel in the reference image and a pixel value of its corresponding pixel in the background image.

Optionally, when Step S3 is performed, it is further performed: obtaining a reconstructed pixel value of the pixel by using an interpolation method based on a weight of the pixel and the corrected pixel information.

Optionally, when Step S3 is performed, it is further performed:

performing a triangulation on the sample image based on the determined pixel information;

determining the weight of the pixel based on the triangle where the pixel is located and which is obtained by the triangulation; and calculating a reconstructed pixel value of the pixel according to the weight of the pixel using a linear interpolation method.

Optionally, when determining the weight of the pixel is performed, it is further performed:

determining distances from the pixel to vertices of a triangle where the pixel is located; and setting weights of the pixel corresponding to the vertices of the triangle to be inversely proportional to the distances between the pixel and the vertices.

Optionally, when calculating the reconstructed pixel value of the pixel is further, it is further performed: performing a calculation according to the following formula:

$$Gx = Wa*Ga + Wb*Gb + Wc*Gc, \text{ where,}$$

Gx represents a reconstructed pixel value of a pixel x;

Wa and Ga respectively represent a weight of the pixel x corresponding to a vertex a of a triangle where it is located and a corrected pixel value of the vertex a;

Wb and Gb respectively represent a weight of the pixel x corresponding to a vertex b of the triangle where it is located and a corrected pixel value of the vertex b; and Wc and Gc respectively represent the weight of the pixel x corresponding to a vertex c of the triangle where it is located and a corrected pixel value of the vertex c.

Optionally, when the program runs in the processor, the program is further configured to perform the following steps: performing a registration processing on the reconstructed image and another image.

By reading the detailed description of the fiber bundle image processing method and the fiber bundle image analysis method above, the composition and technical effects of the fiber bundle image processing apparatus can be understood, and are not further described herein for brevity.

In addition, according to an embodiment of the present disclosure, a storage medium on which program instructions are stored, and when the program instructions are executed by a computer or a processor, the computer or processor executes the corresponding steps of the fiber bundle image processing method according to an embodiment of the present disclosure, and are used to implement corresponding modules or units in the fiber bundle image processing apparatus according to an embodiment of the present disclosure. The storage medium may include, for example, a memory card of a smart phone, a storage part of a tablet computer, a hard disk of a personal computer, a read-only memory (ROM), an erasable programmable read-only memory (EPROM), a portable compact disk read-only memory (CD-ROM), USB memory, or any combination of the above storage media. The computer-readable storage medium may be any combination of one or more computer-readable storage media.

Although exemplary embodiments of the present disclosure have been described with reference to the drawings, it should be understood that, these exemplary embodiments are merely illustrative, not intended to limit the scope of the present disclosure thereto. A person of ordinary skill in the art may make various changes and modifications thereto, without departing from the scope and spirit of the present disclosure. All of these changes and modifications are intended to be included in the scope of the present disclosure as claimed in the attached claims.

A person of ordinary skill in the art will be appreciated that, units and algorithm steps described as examples in combination with the embodiments disclosed in this description may be implemented by electronic hardware or a combination of computer software and electronic hardware. Whether the functions are performed by hardware or software depends on particular applications and design constraint conditions of a technical solution. A person skilled in the art may use different methods for each particular application to implement the described functions, but it should not be considered that such implementation goes beyond the scope of the present disclosure.

In the several embodiments provided in the present disclosure, it should be understood that the disclosed apparatus and method may be implemented in other manners. For example, the described apparatus embodiment is merely exemplary. For example, the division of units is merely a logical function division and may be other division in an actual implementation. For example, a plurality of units or components may be combined or integrated into another apparatus, or some features may be ignored or not performed.

The description provided herein has given a lot of specific details. However, it should be understood that, the embodiments of the present disclosure can be practiced without these specific details. In some embodiments, the well-known methods, structures and techniques are not illustrated in detail, so as not to obscure the understanding of this description.

Similarly, it should be understood that, in order to simplify the present disclosure and help to understand one or more of various aspects of the present disclosure, the various features of the present disclosure, in the aforesaid description of illustrative embodiments of the present disclosure, are sometimes grouped into a single embodiment, drawing, or description thereof. However, the method of the present disclosure should not be explained as reflecting the following intention: i.e. the disclosure sought for protection requires more features than the features clearly defined in each claim. To put more precisely, as is reflected in the attached claims, the inventive point lies in that less features than all the features of a single embodiment disclosed hereinbefore are used to solve a corresponding technical problem. Therefore, the claims complying with a specific embodiment are explicitly incorporated into the specific embodiment, where every claim itself acts as an individual embodiment of the present disclosure.

A person skilled in the art can understand that, in addition to mutual exclusion of features, any combinations can be adopted to combine all the features disclosed by the description (including the attached claims, abstract and drawings) and all process or units of the any method or device disclosed as such. Unless otherwise expressly stated, every feature disclosed by the present description (including the attached claims, abstract and drawings) can be replaced by an alternative feature providing the same, equivalent or similar purpose.

In addition, a person skilled in the art can understand that, although some embodiments described here comprise some features included in other embodiments, instead of other features, combinations of features of different embodiments are deemed as falling into the scope of the present disclosure and forming different embodiments. For example, in the claims, any one of the embodiments sought for protection can be used in various combination modes.

The various component embodiments of the present disclosure can be realized by hardware, or realized by software modules running on one or more processors, or realized by combination thereof. A person skilled in the art should understand that, a microprocessor or a digital signal processor (DSP) can be used in practice for realizing some or all functions of some modules of the fiber bundle image processing apparatus according to the embodiments in the present disclosure. The present disclosure can also be realized as an apparatus program (for example, a computer program and a computer program product) for performing part or all of the method described herein. Such program for realizing the present disclosure can be stored in a computer-readable medium, or can possess the form of one or more signals. Such signals can be downloaded from the internet website or be provided at a carrier signal, or be provided in any other forms.

It should be noticed that, the forgoing embodiments are intended to illustrate the present disclosure and are not for limiting the present disclosure, and a person skilled in the art can design alternative embodiments without departing from the scope of the appended claims. In the claims, any reference sign between parentheses should not be construed as limiting the claims. The word "comprise" does not exclude elements or steps that are not listed in the claims. The word "a" or "one" before the elements does not exclude the existence of a plurality of such elements. The present disclosure can be realized by means of hardware comprising several different elements and by means of a properly programmed computer. In the unit claims listing several devices, several of the devices can be embodied by the same hardware item. The use of words "first", "second" and "third" does not mean any sequence. These words can be explained as name.

The above is only specific implementations of the present disclosure or the description of the specific embodiments, and the scope of the present disclosure is not limited thereto, and all changes or substitutions that can be easily conceived by a person skilled in the art within the technical scope disclosed by the present disclosure should be included within the protection scope of the present disclosure. The scope of the present disclosure should be subject to the scope of the claims.

What is claimed is:

1. A fiber bundle image processing method, comprising:
   determining pixel information corresponding to center positions of fibers in a sample image;
   correcting the determined pixel information; and
   reconstructing the sample image based on the corrected pixel information to obtain a reconstructed image;
   wherein the correcting the determined pixel information comprises calculating a corrected pixel value according to the following formula:

$F=(I_s-I_b) \times K,$ wherein F represents the corrected pixel value, $I_s$ represents a determined pixel value, $I_b$ represents a pixel value of a corresponding pixel in a background image, and K represents a correction coefficient.

2. The method according to claim 1, wherein before the correcting step, the method further comprises calculating the correction coefficient K according to a reference image and the background image by using the following formula:

$K=k/(I_c-I_b),$ wherein $I_c$ represents a pixel value of a corresponding pixel in the reference image, and k represents a proportional coefficient, which is equal to a median value of a difference between a pixel value of a pixel in the reference image and a pixel value of a corresponding pixel in the background image.

3. The method according to claim 2, further comprising:
   sampling a uniform fluorescent sample to obtain the reference image; and
   sampling a fluorescent-free sample to obtain the background image.

4. The method according to claim 1, wherein the reconstructing the sample image based on the corrected pixel information comprises:
   obtaining a reconstructed pixel value of a pixel by using an interpolation method based on a weight of the pixel and the corrected pixel information.

5. The method according to claim 4, wherein the obtaining a reconstructed pixel value of a pixel comprises:
   performing a triangulation on the sample image based on the determined pixel information;
   determining the weight of the pixel based on the triangle where the pixel is located and which is obtained by the triangulation; and
   calculating the reconstructed pixel value of the pixel according to the weight of the pixel using a linear interpolation method.

6. The method according to claim 5, wherein the determining the weight of the pixel comprises:
   determining distances from the pixel to vertices of the triangle where the pixel is located; and
   setting weights of the pixel corresponding to the vertices of the triangle to be inversely proportional to the distances between the pixel and the vertices.

7. The method according to claim 6, wherein calculating the reconstructed pixel value of the pixel is performed according to the following formula:

$Gx=Wa*Ga+Wb*Gb+Wc*Gc,$ wherein,

Gx represents a reconstructed pixel value of a pixel x;
   Wa and Ga respectively represent a weight of the pixel x corresponding to a vertex a of a triangle where it is located and a corrected pixel value of the vertex a;
   Wb and Gb respectively represent a weight of the pixel x corresponding to a vertex b of the triangle where it is located and a corrected pixel value of the vertex b;
   Wc and Gc respectively represent a weight of the pixel x corresponding to a vertex c of the triangle where it is located and a corrected pixel value of the vertex c.

8. The method according to claim 5, wherein calculating the reconstructed pixel value of the pixel is performed according to the following formula:

$Gx=Wa*Ga+Wb*Gb+Wc*Gc,$ wherein,

Gx represents a reconstructed pixel value of a pixel x;
   Wa and Ga respectively represent a weight of the pixel x corresponding to a vertex a of a triangle where it is located and a corrected pixel value of the vertex a;
   Wb and Gb respectively represent a weight of the pixel x corresponding to a vertex b of the triangle where it is located and a corrected pixel value of the vertex b;
   Wc and Gc respectively represent a weight of the pixel x corresponding to a vertex c of the triangle where it is located and a corrected pixel value of the vertex c.

9. The method according to claim 1, further comprising:
   performing a registration processing on the reconstructed image and another image.

10. A fiber bundle image processing apparatus, comprising:

a memory, configured to store a program;
a processor, configured to run the program;
wherein the program, when running in the processor, is used to perform the following steps:
determining pixel information corresponding to a center position of a fiber in a sample image;
correcting the determined pixel information; and
reconstructing the sample image based on the corrected pixel information to obtain a reconstructed image;
wherein the correcting the determined pixel information comprises calculating a corrected pixel value according to the following formula:

$$F=(I_s-I_b)\times K,$$

wherein F represents the corrected pixel value, $I_s$ represents a determined pixel value, $I_b$ represents a pixel value of a corresponding pixel in a background image, and K represents a correction coefficient.

* * * * *